(12) United States Patent
Hatta et al.

(10) Patent No.: US 6,625,043 B2
(45) Date of Patent: Sep. 23, 2003

(54) POWER SUPPLY UNIT AND DRIVING METHOD THEREOF

(75) Inventors: Masaharu Hatta, Tokyo (JP); Katsuhiko Shimizu, Tokyo (JP); Masato Watanabe, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/013,365

(22) Filed: Dec. 13, 2001

(65) Prior Publication Data

US 2002/0114174 A1 Aug. 22, 2002

(30) Foreign Application Priority Data

Feb. 21, 2001 (JP) .................................. 2001-045299
Feb. 21, 2001 (JP) .................................. 2001-045308

(51) Int. Cl.[7] .............................................. H02M 3/335
(52) U.S. Cl. ................................................... 363/21.06
(58) Field of Search ........................ 363/16, 20, 21.01, 363/21.04, 21.06, 21.14, 95, 97, 131

(56) References Cited

U.S. PATENT DOCUMENTS

| 4,870,555 A | * | 9/1989 | White | 363/21 |
| 5,781,420 A | * | 7/1998 | Xia et al. | 363/21 |
| 5,986,895 A | * | 11/1999 | Stewart et al. | 363/13 |
| 5,999,420 A | * | 12/1999 | Aonuma et al. | 363/21 |
| 6,496,395 B2 | * | 12/2002 | Tokunaga et al. | 363/97 |

FOREIGN PATENT DOCUMENTS

| JP | 11-235029 | 8/1999 |
| JP | 11-289760 | 10/1999 |

* cited by examiner

Primary Examiner—Matthew V. Nguyen
(74) Attorney, Agent, or Firm—Oblon, Spivak, McClelland, Maier & Neustadt, P.C.

(57) ABSTRACT

A switching power supply unit includes: a switch circuit equipped with a first transistor, the switch circuit converting a DC input into an AC; a transformer for transforming the AC; an output rectifier equipped with a second transistor serially connected to the transformer and a third transistor connected in parallel to the transformer, the output rectifier rectifying the output of the transformer; and a control circuit for controlling ON/OFF of the first to third transistors. The control circuit turns ON the second transistor before turning ON the third transistor and turning ON the first transistor.

11 Claims, 9 Drawing Sheets

POWER SUPPLY UNIT AND DRIVING METHOD THEREOF

BACKGROUND OF THE INVENTION

The present invention relates to a switching power supply unit and a driving method thereof, and in particular to a synchronous rectification switching power supply unit that uses switch elements in an output rectifier and a driving method thereof.

Conventionally, a so-called DC-to-DC converter is known as a switching power supply unit. A representative DC-to-DC converter converts a direct current (DC) into an alternating current (AC) by using a switching circuit, transforms (steps up/down) the AC by using a transformer, and converts the resulting AC into a DC by using an output circuit, thereby obtaining a DC output having a voltage different from the input voltage.

In some cases, an output rectifier used in a DC-to-DC converter employs a switch element such as a transistor for control in synchronization with an input switching circuit. ADC-to-DC converter having such an output rectifier is generally called a synchronous rectification switching power supply unit.

Figure 1:
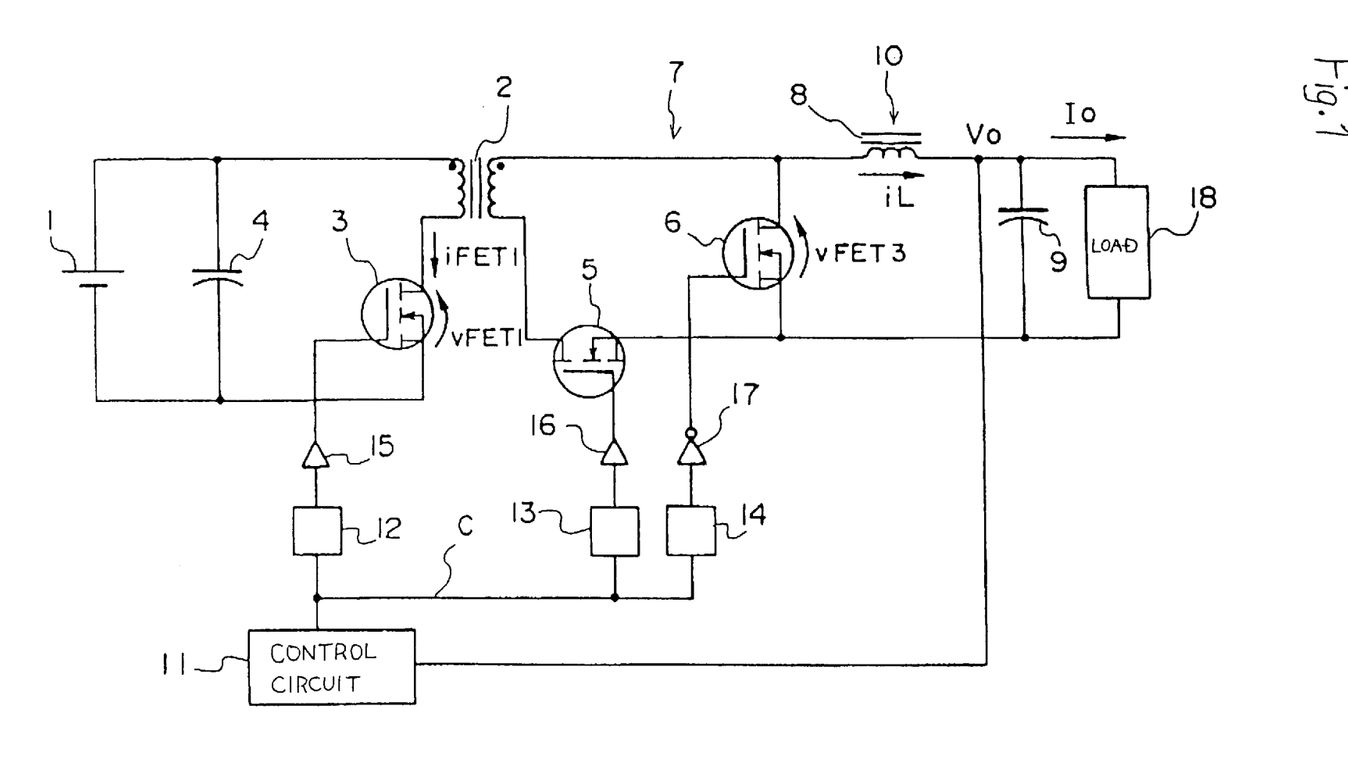
FIG. 1 is a circuit diagram showing a general synchronous rectification switching power supply unit.

FIG. 1 is a circuit diagram showing a general synchronous rectification switching power supply unit.

As shown in FIG. 1, a synchronous rectification switching power supply unit includes: a transformer 2 where a primary winding is connected to a positive terminal of a DC input supply 1; a first transistor 3 connected between a negative terminal of the DC input supply 1 and the primary winding of the transformer 2; an input capacitor 4 connected across the terminals of the DC input supply 1; an output rectifier 7 having a second transistor 5 and a third transistor 6, the output rectifier rectifying waveforms that appear at a secondary winding of the transformer 2; an output smoothing section 10 having a choke coil 8 and a smoothing capacitor 9, the output smoothing section smoothing the output of the output rectifier 7; a control circuit 11 for generating a control signal C based on the output voltage Vo; timing adjusters 12 through 14 for respectively providing the control signal C with predetermined delays; a buffer 15 for generating a first gate signal Vg1 supplied to the gate of the first transistor 3 based on the output of the timing adjuster 12; a buffer 16 for generating a second gate signal Vg2 supplied to the gate of the second transistor 5 based on the output of the timing adjuster 13; and an inverter 17 for generating a third gate signal Vg3 supplied to the gate of the third transistor 6 based on the output of the timing adjuster 14. The output of the output smoothing section 10 is connected to a load 18 to be driven.

Figure 2:
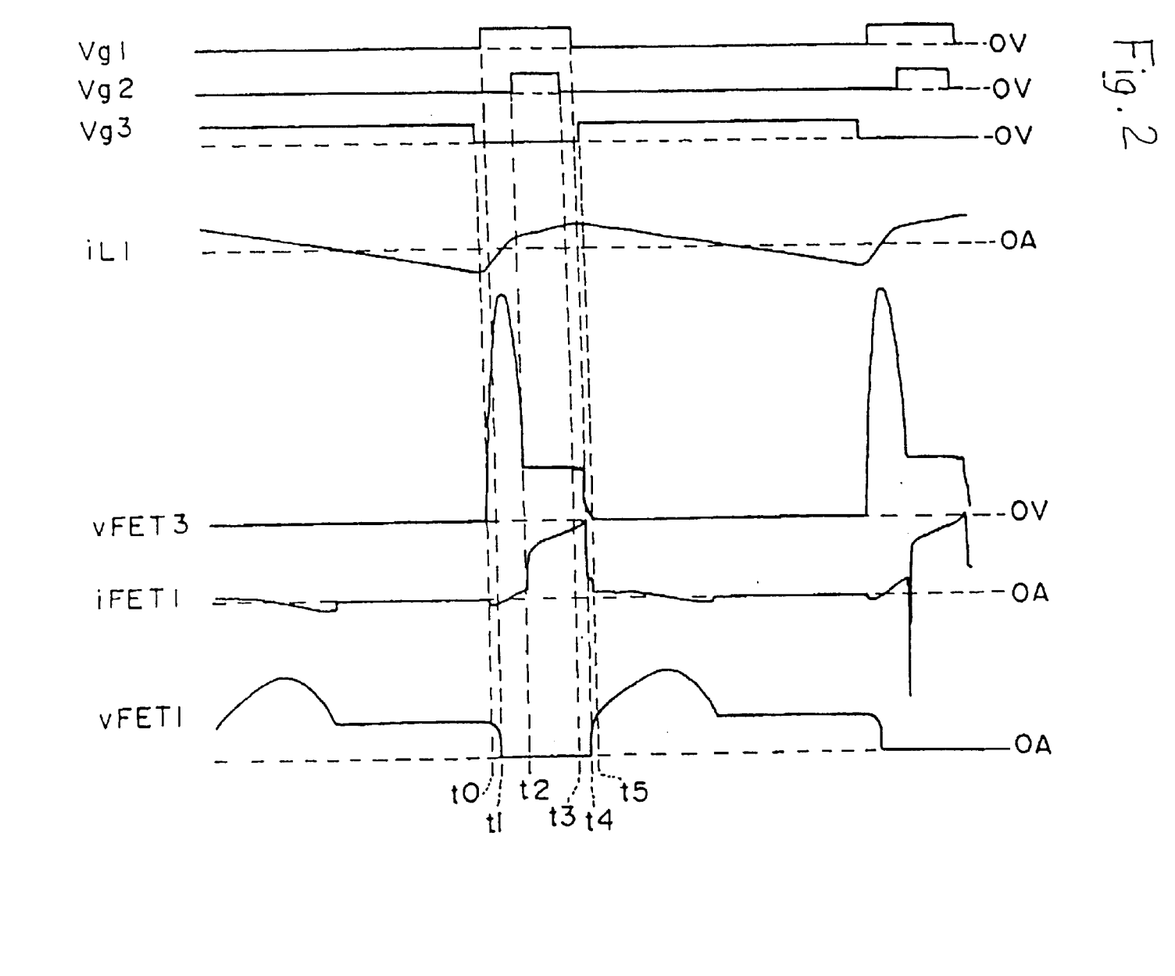
FIG. 2 is a timing chart showing a related art driving method in a synchronous rectification switching power supply unit.

FIG. 2 is a timing chart showing a conventional art driving method in the aforementioned synchronous rectification switching power supply unit.

In a synchronous rectification switching power supply unit of this kind, the first transistor 3 and the third transistor 6 alternately repeats turning on and turning off. The basic operation is to turn ON the second transistor 5 while the first transistor 3 is ON.

As shown in FIG. 2, in the conventional driving method, to shift the first transistor 3 from OFF to ON and shift the third transistor 6 from ON to OFF, the third gate signal Vg3 is driven low to turn OFF the third transistor 6 (time t0), the first gate signal Vg1 is driven high to turn ON the first transistor 3 (time t1), and finally the second gate signal Vg2 is driven high to turn ON the second transistor 5 (time t2) To shift the first transistor 3 from ON to OFF and shift the third transistor 6 from OFF to ON, the second gate signal Vg2 is driven low to turn OFF the second transistor 5 (time t3), the first gate signal Vg1 is driven low to turn OFF the first transistor 3 (time t4), and finally the third gate signal Vg3 is driven high to turn ON the third transistor 6 (time t5).

In this way, delay amount of each of the timing adjusters 12 through 14 is set so that the timings of the first to third gate signals Vg1 through Vg3 are provided as mentioned earlier. By setting the delay amount of the timing adjusters 12 through 14 and changing the first to third gate signals Vg1 through Vg3 with the timings shown in FIG. 2, it is possible to prevent the first transistor 3 and the third transistor 6 from turning ON simultaneously and causing a through current to flow.

Figure 7:
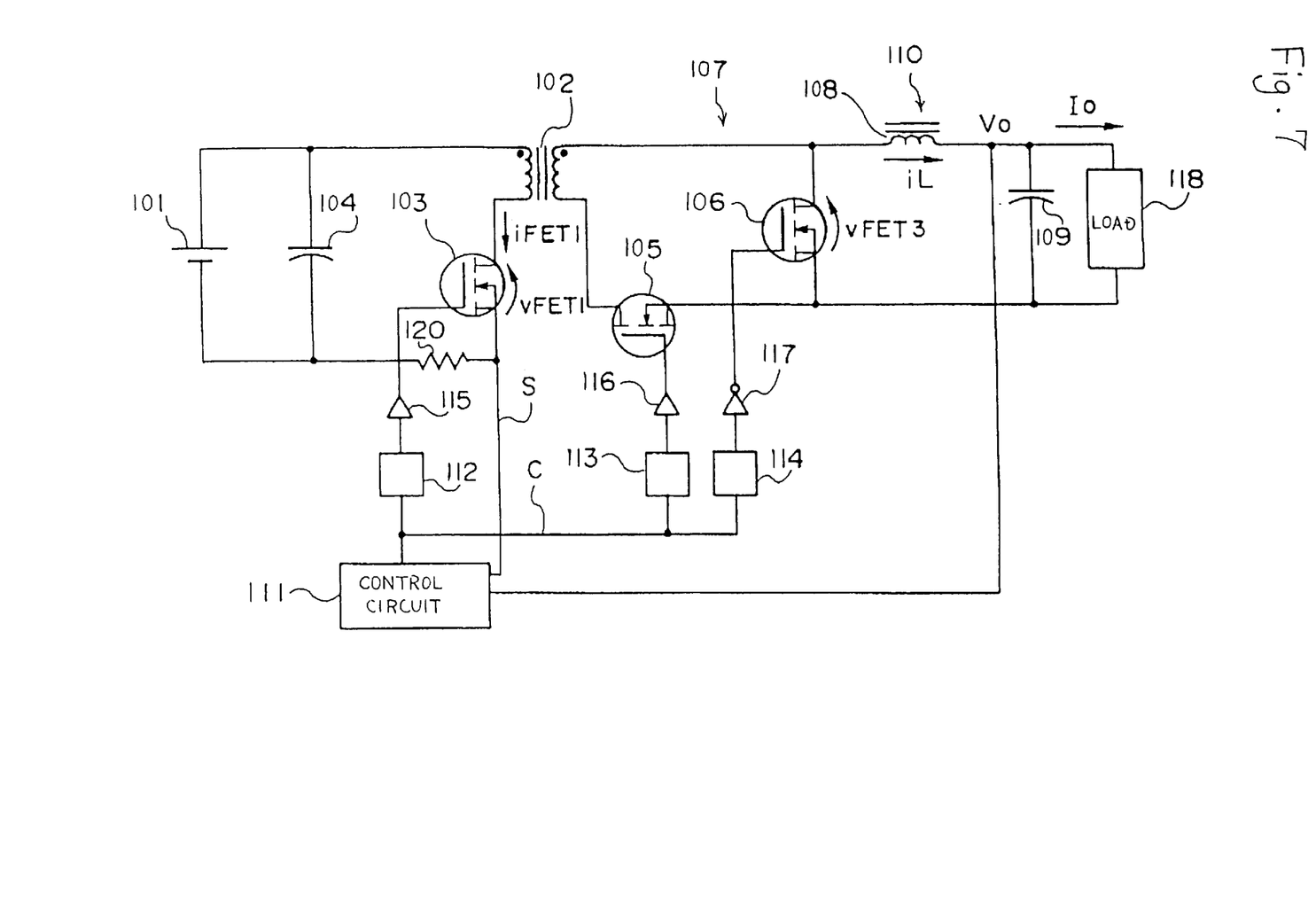
FIG. 7 is a circuit diagram showing a general synchronous rectification switching power supply unit.

FIG. 7 is a circuit diagram showing a general synchronous rectification switching power supply unit where current mode control is performed.

As shown in FIG. 7, a synchronous rectification switching power supply unit includes: a transformer 102 where a primary winding is connected to a positive terminal of a DC input supply 101; a first transistor 103 and a resistor 120 connected between a negative terminal of the DC input supply 101 and the primary winding of the transformer 102; an input capacitor 104 connected across the terminals of the DC input supply 101; an output rectifier 107 having a second transistor 105 and a third transistor 106, the output rectifier rectifying waveforms that appear at a secondary winding of the transformer 102; an output smoothing section 110 having a choke coil 108 and a smoothing capacitor 109, the output smoothing section smoothing the output of the output rectifier 107; a control circuit 111 for generating a control signal C based on the output voltage Vo; timing adjusters 112 through 114 for respectively providing the control signal C with predetermined delays; a buffer 115 for generating a first gate signal Vg1 supplied to the gate of the first transistor 103 based on the output of the timing adjuster 112; a buffer 116 for generating a second gate signal Vg2 supplied to the gate of the second transistor 105 based on the output of the timing adjuster 113, and an inverter 117 for generating a third gate signal Vg3 supplied to the gate of the third transistor 106 based on the output of the timing adjuster 114. The output of the output smoothing section 110 is connected to a load 118 to be driven.

The resistor 120 is used to extract a current iFET1 flowing the first transistor 103 as a voltage value. The extracted voltage value is supplied to the control circuit 111 as a current signal S.

Figure 8:
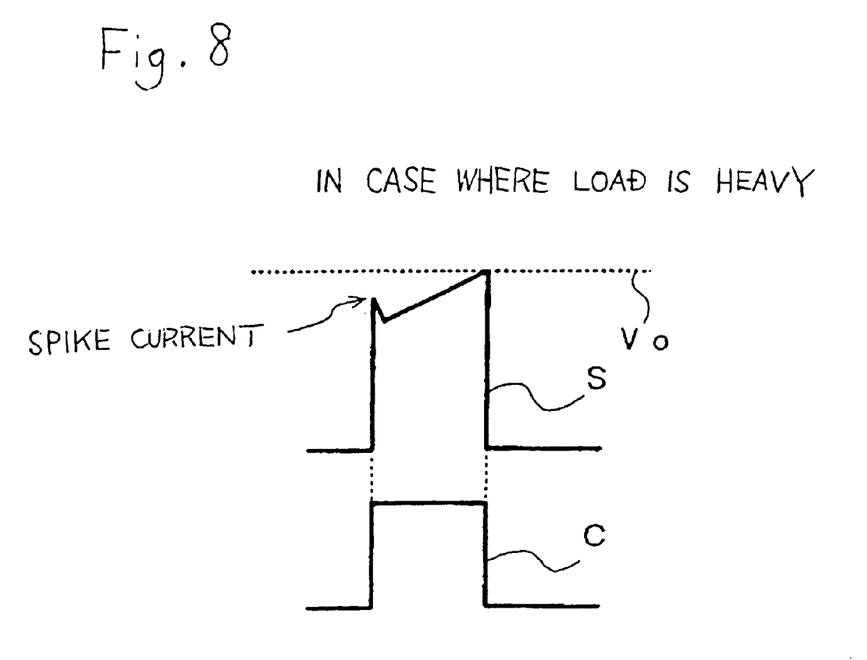
FIG. 8 is a timing chart showing a related art method for generating a control signal C in case the load 18 is heavy.
Figure 9:
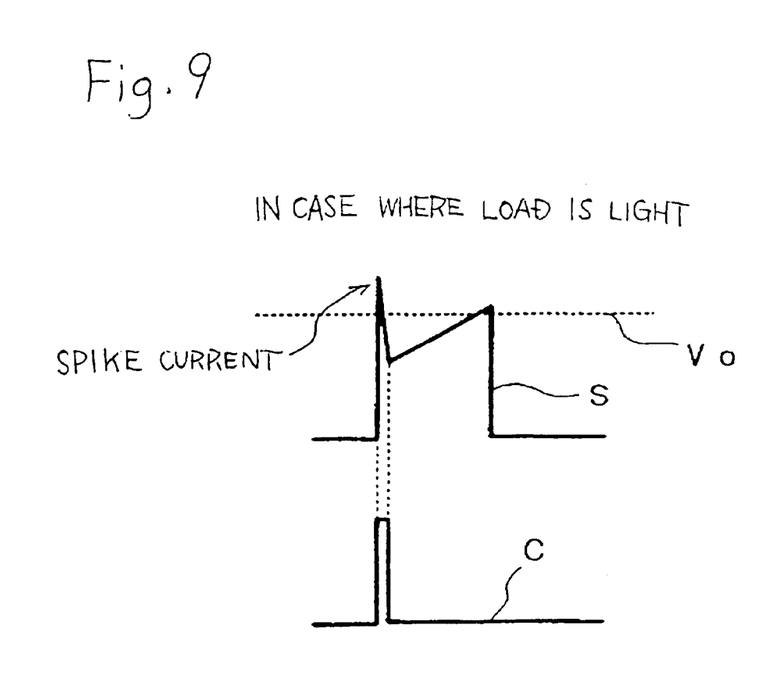
FIG. 9 is a timing chart showing a related art method for generating a control signal C in case the load 18 is light.

FIG. 8 is a timing chart showing a method for generating a control signal C.

As shown in FIG. 8, in the control circuit 111, the output voltage Vo is compared with the current signal S and the control signal C is asserted in response to an internal clock. The control signal C is negated with the timing the value of the current signal S has reached the output voltage Vo. Accordingly, the duty cycle of the control signal C is controlled based on the output voltage Vo and the current signal S. A method for setting the duty cycle of the control signal C based on the comparison between the output voltage Vo and the current signal S is generally called "current mode control."

In the synchronous rectification switching power supply unit shown in FIG. 1 and driven by the driving method shown in FIG. 2, in case the load 18 is light and the output current Io is small, a choke current iL may be inverted in a period the first transistor 3 is OFF (from time t5 to next time T0), as shown in FIG. 2. In this case, the inverted current flows via the third transistor 6 that is ON. When the third transistor 6 turns OFF at time t0, the current flow is interrupted and appears as a fly-back voltage across the third transistor 6, as shown in FIG. 2.

Such a fly-back voltage depends on the energy accumulated in the choke coil 8 and may exceed the withstand voltage of the third transistor 6 thus damaging an element. In order to prevent this, it was necessary to use a transistor having a sufficiently high withstand voltage as the third transistor 6 in the related art.

The Japanese Patent Publication No. H11-289760 shows a technology to suppress an inverted current by detecting or predicting the occurrence of an inverted current as an approach to prevent occurrence of a fly-back voltage.

However, considering the accuracy and temperature characteristics of elements used, it is difficult to correctly detect occurrence of the inverted current. Even in case a preset value is used to predict occurrence of the inverted current, providing an ample margin considering the accuracy and temperature characteristics of elements used increases the period both of the second transistor 5 and the third transistor 6 are OFF, called a dead time, thus increasing the loss. Moreover, a circuit is necessary to detect or predict occurrence of an inverted current thus increasing the number of elements.

Further, in the method for generating the control signal C shown in FIG. 8 in the synchronous rectification switching power supply unit shown in FIG. 7, while in case the load 118 is heavy and the output current Io is large, comparison is correctly made between the output voltage Vo and the current signal S as shown in FIG. 8, in case the load 118 is light and the output current Io is small, a spike current caused by a discharge current to the parasitic capacity of the third transistor 106 or a recovery current for a parasitic diode of the third transistor 106 may exceed the actual peak value of the current signal S. In such a case, the control signal C is negated in response to the spike current and a correct duty cycle is not obtained. In particular, a synchronous rectification switching power supply unit often uses a plurality of transistors connected in parallel as the second transistor and the third transistor 106 in order to reduce the loss in the output rectifier 107. In such a case, the spike current is more noticeable.

In order to solve this problem, a low-pass filter may be used to remove a spike waveform from the current signal S. However, this method increases the number of elements and distorts the waveform of the current signal S thus preventing correct control by the control circuit 111.

SUMMARY OF THE INVENTION

Thus, the object of the invention is to provide a switching power supply unit and that can effectively prevent occurrence of a fly-back voltage without increasing the number of elements its driving method.

Further, the object of the invention is to provide a switching power supply unit that performs current mode control, the switching power supply unit effectively preventing occurrence of a spike waveform of a current signal without increasing the number of elements, and its driving method.

The object of the invention is attained by a switching power supply unit including: a switch circuit equipped with at least a first switch, the switch circuit converting a DC input into an AC; a transformer for transforming the AC; an output rectifier equipped with at least a second switch serially connected to the transformer and a third switch connected in parallel to the transformer, the output rectifier rectifying the output of the transformer; and a controller for controlling ON/OFF of the first to third switch, wherein the controller turns ON the second switch before turning ON the third switch and turning ON the first switch.

The object of the invention is also attained by a switching power supply unit including: a switch circuit equipped with at least a first switch, the switch circuit converting a DC input into an AC, a transformer for transforming the AC; an output rectifier equipped with at least a second switch serially connected to the transformer and a third switch connected in parallel to the transformer, the output rectifier rectifying the output of the transformer; an output smoothing section equipped with at least a choke coil serially connected to the transformer and a smoothing capacitor connected in parallel to the transformer, the output smoothing section smoothing the output of the output rectifier; and a controller for controlling ON/OFF of the first to third switch, wherein the controller turns ON the second switch then turns OFF the third switch while the inverted current from the choke coil is flowing into the third switch.

Preferably, the controller controls ON/OFF of the first to third switches via voltage mode control.

The object of the invention is also attained by a driving method for a switching power supply unit including a switch circuit equipped with at least a first switch, the switch circuit converting a DC input into an AC, a transformer for transforming the AC, and an output rectifier equipped with at least a second switch serially connected to the transformer and a third switch connected in parallel to the transformer, the output rectifier rectifying the output of the transformer, the driving method including the steps of: turning ON the second switch; turning OFF the third switch; and turning ON the first switch.

The object of the invention is also attained by a driving method for a switching power supply unit including a switch circuit equipped with at least a first switch, the switch circuit converting a DC input into an AC, a transformer for transforming the AC, an output rectifier equipped with at least a second switch serially connected to the transformer and a third switch connected in parallel to the transformer, the output rectifier rectifying the output of the transformer, and an output smoothing section equipped with at least a choke coil serially connected to the transformer and a smoothing capacitor connected in parallel to the transformer, the output smoothing section smoothing the output of the output rectifier, the driving method including the steps of: lowering the voltage across the first switch by feeding the inverted current from the choke coil into the transformer; and then turning ON the first switch.

According to the switching power supply unit and its driving method of the invention as described earlier, a fly-back voltage does not occur across the third switch element thus preventing damage to the elements as well as eliminating the need for using a switch having a high withstand voltage as the third switch. Further, when the first switch turns ON the voltage across the first switch is lowered so that it is possible to reduce a switching loss caused by the first switch.

The object of the invention is attained by a switching power supply unit including: a switch circuit equipped with at least a first switch, the switch circuit converting a DC input into an AC; a transformer for transforming the AC; an output rectifier equipped with at least a second switch serially connected to the transformer and a third switch connected in parallel to the transformer, the output rectifier rectifying the output of the transformer; and a controller for controlling ON/OFF of the first to third switch via current mode control, wherein the controller turns ON the second switch before turning ON the third switch and turning ON the first switch.

The object of the invention is also attained by a switching power supply unit including: a switch circuit equipped with at least a first switch, the switch circuit converting a DC input into an AC; a transformer for transforming the AC; an output rectifier equipped with at least a second switch serially connected to the transformer and a third switch connected in parallel to the transformer, the output rectifier rectifying the output of the transformer; an output smoothing section equipped with at least a choke coil serially connected to the transformer and a smoothing capacitor connected in parallel to the transformer, the output smoothing section smoothing the output of the output rectifier; and a controller for controlling ON/OFF of the first to third switch via current mode control, wherein the controller turns ON the second switch then turns OFF the third switch while the inverted current from the choke coil is flowing into the third switch.

Preferably, the current mode control uses at least the information indicating the volume of a current flowing in the transformer and the information indicating the output voltage value of the output smoothing section to control ON/OFF of the first to third switches.

The object of the invention is also attained by a driving method for a switching power supply unit including a switch circuit equipped with at least a first switch, the switch circuit converting a DC input into an AC, a transformer for transforming the AC, an output rectifier equipped with at least a second switch serially connected to the transformer and a third switch connected in parallel to the transformer, the output rectifier rectifying the output of the transformer, and an output smoothing section equipped with at least a choke coil serially connected to the transformer and a smoothing capacitor connected in parallel to the transformer, the output smoothing section smoothing the output of the output rectifier, the driving method including the steps of: generating a control signal by using at least the information about the volume of a current flowing in the transformer and the information about the output voltage value of the output smoothing section to generate a control signal; and, based on the control signal, turning ON the second switch, turning OFF the third switch, and then turning ON the first switch.

According to the switching power supply unit and its driving method of the invention as described earlier, it is possible to correctly control ON/OFF of the first to third switch via current mode control. Moreover, a fly-back voltage does not occur across the third switch element thus preventing damage to the elements as well as eliminating the need for using a switch having a high withstand voltage as the third switch. Further, when the first switch turns ON the voltage across the first switch is lowered so that it is possible to reduce a switching loss caused by the first switch.

DETAILED DESCRIPTION OF THE PREFERRED EMBODIMENT

A preferred embodiment of the invention will be detailed with reference to the drawings.

(Embodiment 1)

A switching power supply unit according to the first embodiment includes the similar circuit configuration as that of the switching power supply unit shown in FIG. 1. Thus, the particular configuration is the same as that described earlier and repeated description will be omitted. Note that the delay characteristics of the timing adjusters 12 through 14 differ from those in the related art.

Figure 3:
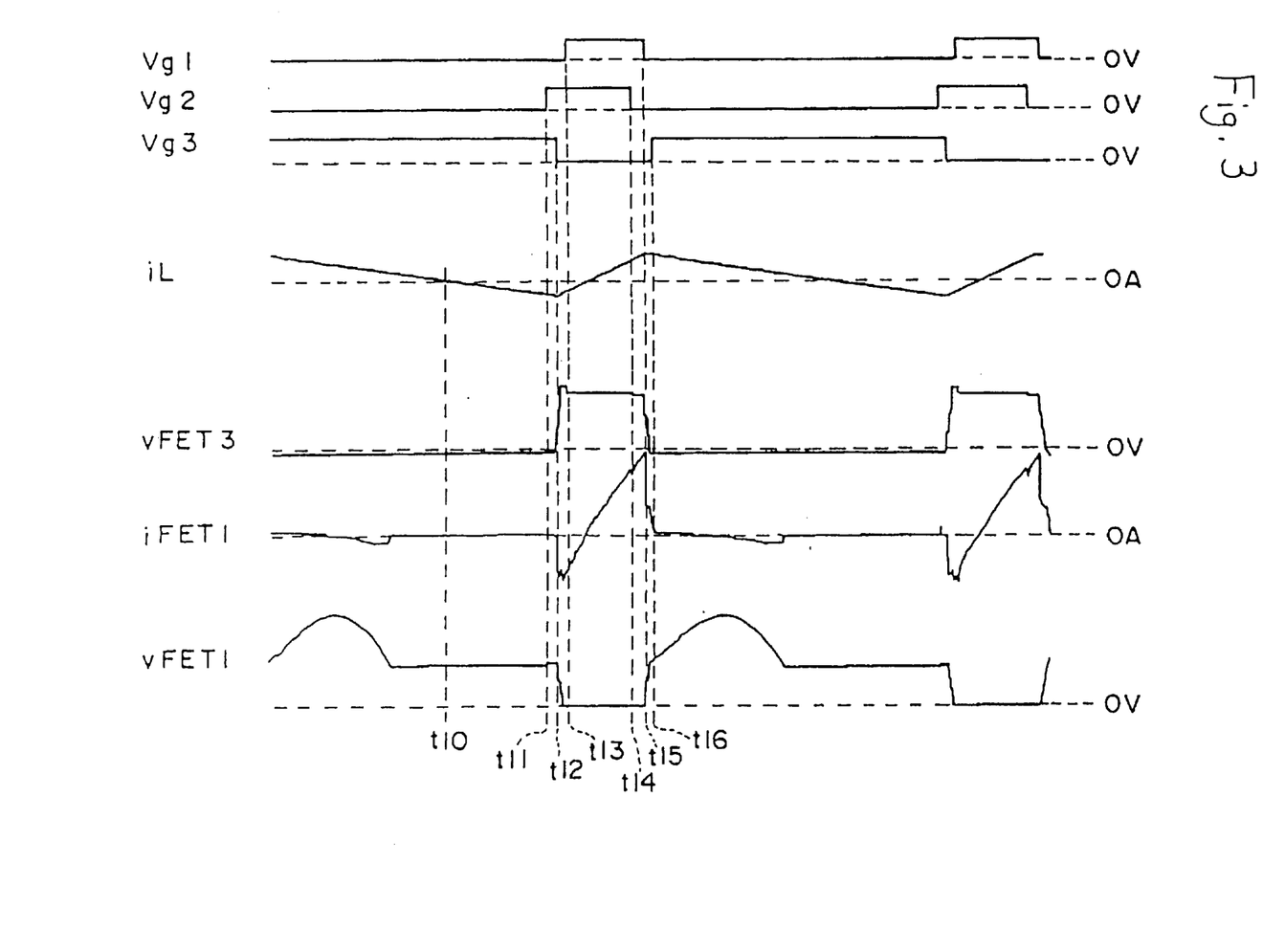
FIG. 3 is a timing chart showing a method for driving a switching power supply unit according to a first embodiment of the invention.

FIG. 3 is a timing chart showing a method for driving a switching power supply unit according to this embodiment.

As shown in FIG. 3, in the driving method according to this embodiment, to shift the first transistor 3 from OFF to ON and shift the third transistor 6 from ON to OFF, the second gate signal Vg2 is driven high to turn ON the second transistor 5 (time t11), the third gate signal Vg3 is driven low to turn OFF the third transistor 6 (time t12), and finally the first gate signal Vg1 is driven high to turn ON the first transistor 3 (time t13). To shift the first transistor 3 from ON to OFF and shift the third transistor 6 from OFF to ON, the second gate signal Vg2 is driven low to turn OFF the second transistor 5 (time t14), the first gate signal Vg1 is driven low to turn OFF the first transistor 3 (time t15), and finally the third gate signal Vg3 is driven high to turn ON the third transistor 6 (time t16).

In this way, delay amount of each of the timing adjusters 12 through 14 is set so that the timings of the first to third gate signals Vg1 through Vg3 are provided as mentioned earlier.

Figure 4:
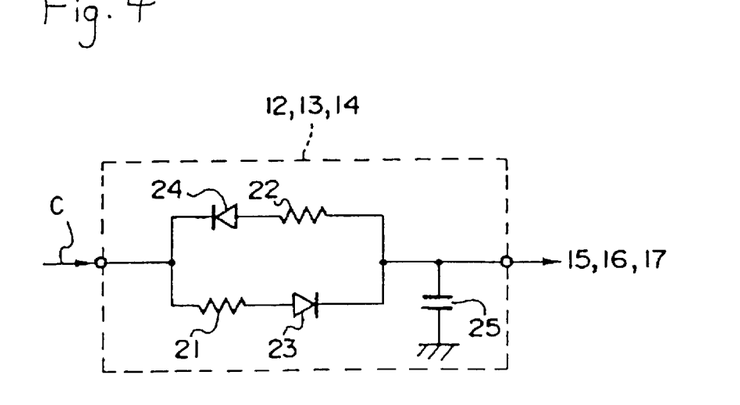
FIG. 4 is a circuit diagram showing a particular internal configuration of timing adjusters 12 through 14.

FIG. 4 is a circuit diagram showing a particular internal configuration of timing adjusters 12 through 14.

As shown in FIG. 4, each of timing adjusters 12 through 14 is a bidirectional time-constant circuit including resistors 21 and 22, diodes 23 and 24, and a capacitor 25. By properly setting the resistance values of the resistors 21 and 22, it is possible to independently set a delay amount for the leading edge of the control signal C and a delay amount for the trailing edge of the control signal C.

The control signal C is generated based on the comparison between an output voltage Vo and a reference wave S in the shape of a saw-tooth wave in the control circuit 11.

Figure 5:
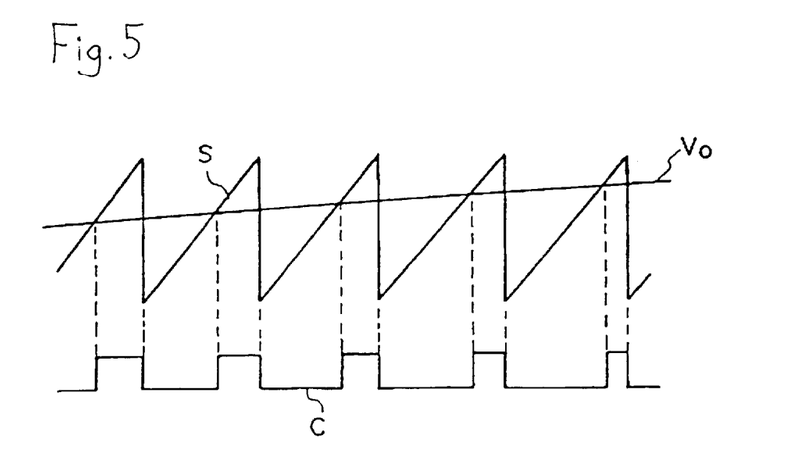
FIG. 5 is a timing chart showing a method for generating a control signal C.

FIG. 5 is a timing chart showing a method for generating a control signal C.

As shown in FIG. 5, the output voltage Vo supplied to the control circuit 11 is compared with the saw-tooth-shaped reference wave S and the duty cycle of the control signal C is determined accordingly. A method for setting the duty cycle of the control signal C based on the comparison between the output voltage Vo and the reference wave S is generally called "voltage mode control."

Next, referring to FIG. 3, changes in the voltage and current in each section of the switching power supply unit according to this embodiment will be detailed.

In case the load 18 is light and the output current Io is small, a choke current iL is inverted with a predetermined timing (time t10) in a period the first transistor 3 is OFF (from time t15 to next time T13), as shown in FIG. 3. In this case, the inverted current flows via the third transistor 6 that is ON.

When the second transistor 2 turns ON (time t11) while the inverted current flowing in the third transistor 6, the inverted current does not flow in the secondary wiring of the transformer 2 and the path in the second transistor 5 but flows only via the third transistor 6, because the transformer 2 is short circuited by the third transistor 6.

In such a state, when the third transistor 6 turns OFF (time t12), the inverted current starts to flow via a current path formed of the secondary wiring of the transformer 2 and the second transistor 5. Thus, a fly-back voltage does not appear across the third transistor 6 that has turned OFF. In this practice, the current flowing in the secondary wiring of the transformer 2 is also provided to the primary wiring of the transformer 2 thus discharging the parasitic capacity of the first transistor 3.

Figure 6:
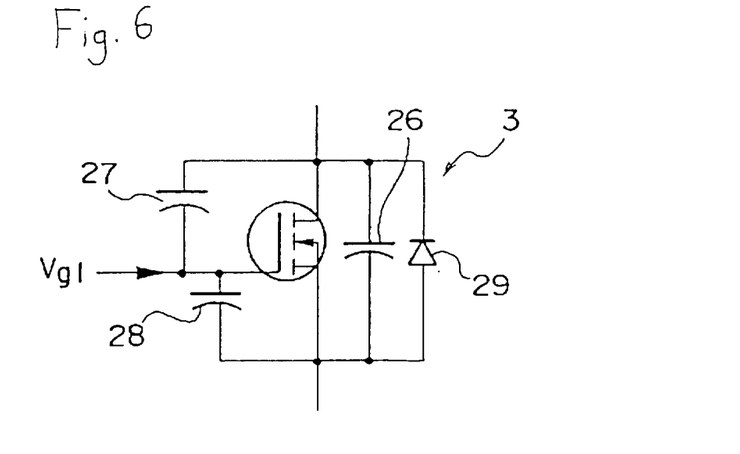
FIG. 6 is an equivalent circuit showing a parasitic component in the first transistor 3.

FIG. 6 is an equivalent circuit showing a parasitic component contained in the first transistor 3.

As shown in FIG. 6, the first transistor 3 has parasitic capacities 26 through 28 and a parasitic diode 29. As mentioned earlier, when the first transistor 3 turns ON, the parasitic capacities 26 and 27 are discharged and the current flows via the parasitic diode 29. As a result, a voltage vFET1 across the first transistor 3 drops rapidly, to substantially zero. The current flowing in the parasitic capacities 26 and 27 and the parasitic diode 29 is regenerated into the DC input power supply 1.

Finally the first transistor 3 turns ON (time t13) to excite the primary wiring of the transformer 2 thus increasing the inductor current iL. In this practice, as mentioned earlier, the voltage vFET1 across the first transistor 3 is substantially zero so that the requirements of ZVS (Zero Voltage Switching) are satisfied and a switching loss is negligible. Referring to FIG. 2 that shows a related art driving method, it is understood that the first transistor 3 is under hard switching at time t1.

In this way, according to this embodiment, a fly-back voltage does not appear across the third transistor 6 so that it is possible to prevent damage to the elements as well as eliminate the need for using a transistor having a high withstand voltage as the third transistor 6. Further, the requirements for ZVS are substantially satisfied when the first transistor 3 turns ON so that it is possible to reduce a switching loss and a switching noise caused by the first transistor 3.

It goes without saying that, the invention is not limited to this embodiment but various changes may be made.

For example, while the control signal C is supplied to the timing adjusters 12 through 14 in common and delay characteristics of the timing adjusters 12 through 14 are used to obtain the waveforms of the first to third gate signals Vg1 through Vg3 shown in FIG. 3 in this embodiment, the first to third gate signals Vg1 through Vg3 having waveforms shown in FIG. 3 may be directly generated via the control circuit 11, without using the timing adjusters 12 through 14.

While the control signal C is generated by comparing the output voltage Vo with the saw-tooth-shaped reference wave S in this embodiment, this does not limit the method for generating the control signal C but other methods may be used to generate the control signal C.

(Embodiment 2)

A switching power supply unit according to the second embodiment includes the similar circuit configuration as that of the switching power supply unit shown in FIG. 7. Thus, the particular configuration is the same as that described earlier and repeated description will be omitted. Note that the delay characteristics of the timing adjusters 112 through 114 differ from those in the related art.

Figure 10:
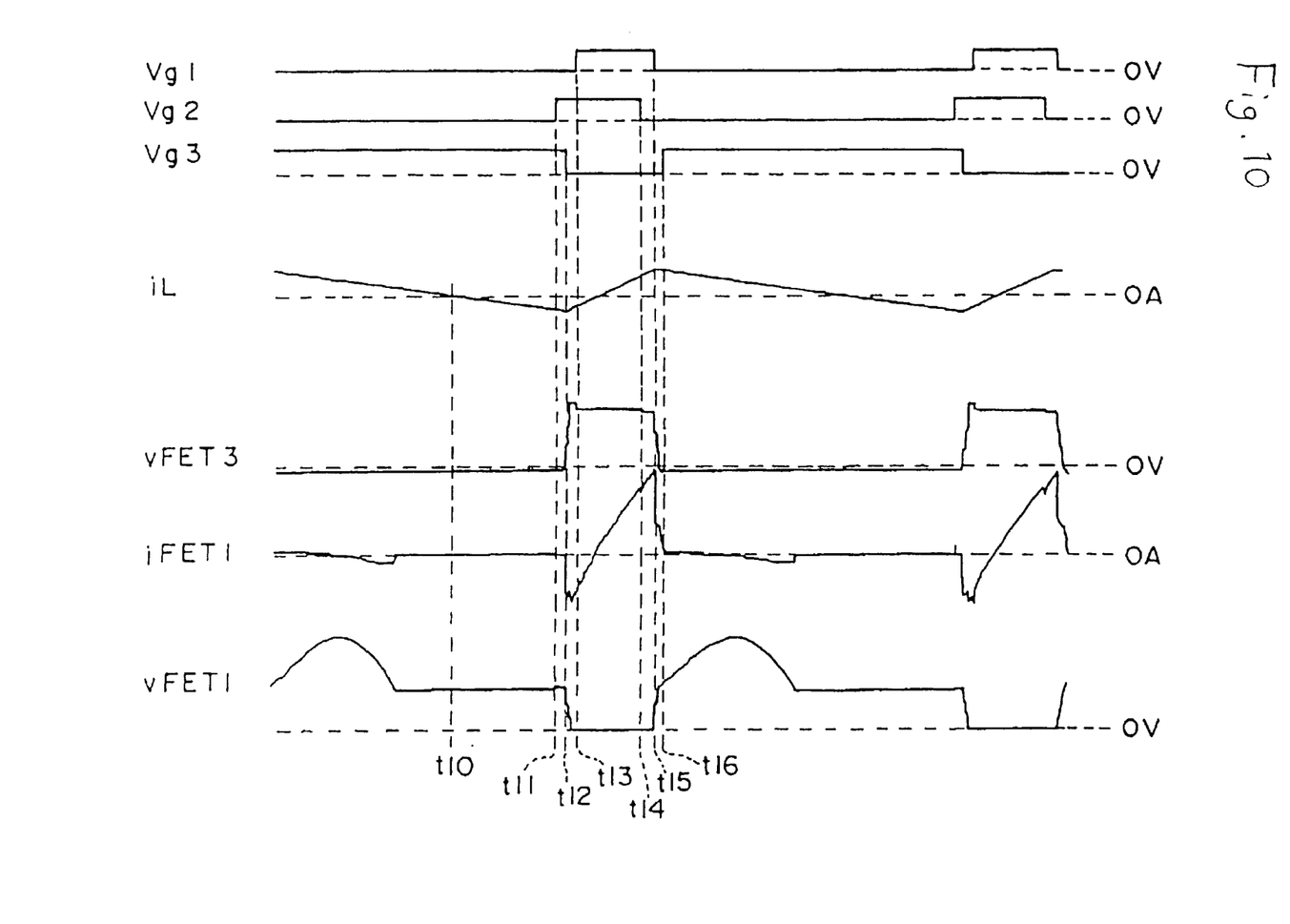
FIG. 10 is a timing chart showing a method for driving a switching power supply unit according to a second embodiment of the invention.

FIG. 10 is a timing chart showing a method for driving a switching power supply unit according to this embodiment.

As shown in FIG. 10, in the driving method according to this embodiment, to shift the first transistor 103 from OFF to ON and shift the third transistor 106 from ON to OFF, the second gate signal Vg2 is driven high to turn ON the second transistor 105 (time t11), the third gate signal Vg3 is driven low to turn OFF the third transistor 106 (time t12), and finally the first gate signal Vg1 is driven high to turn ON the first transistor 103 (time t13). To shift the first transistor 103 from ON to OFF and shift the third transistor 106 from OFF to ON, the second gate signal Vg2 is driven low to turn OFF the second transistor 105 (time t14), the first gate signal Vg1 is driven low to turn OFF the first transistor 103 (time t15), and finally the third gate signal Vg3 is driven high to turn ON the third transistor 106 (time t16).

In this way, delay amount of each of the timing adjusters 12 through 14 is set so that the timings of the first to third gate signals Vg1 through Vg3 are provided as mentioned earlier.

Figure 11:
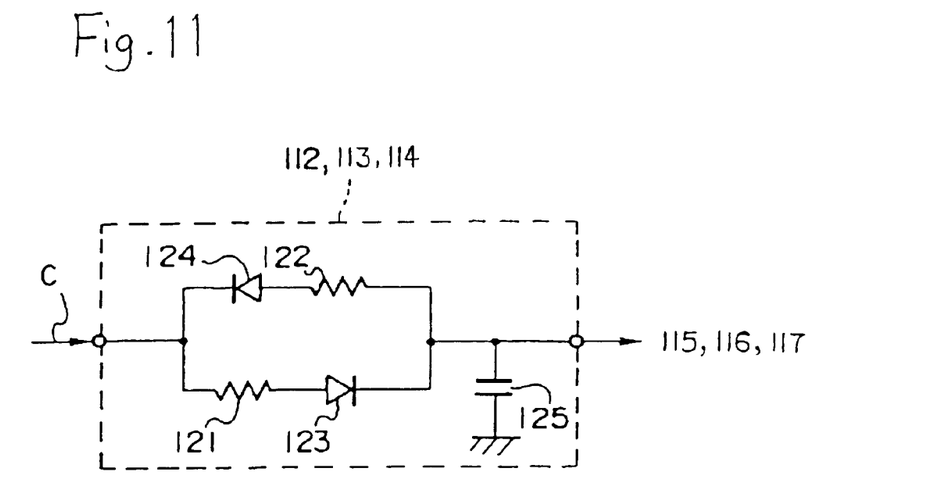
FIG. 11 is a circuit diagram showing a particular internal configuration of timing adjusters 12 through 14.

FIG. 11 is a circuit diagram showing a particular internal configuration of timing adjusters 112 through 114.

As shown in FIG. 11, each of timing adjusters 112 through 114 is a bidirectional time-constant circuit including resistors 121 and 122, diodes 123 and 124, and a capacitor 125. By properly setting the resistance values of the resistors 121 and 122, it is possible to independently set a delay amount for the leading edge of the control signal C and a delay amount for the trailing edge of the control signal C.

As mentioned earlier, the control signal C is generated based on the comparison between an output voltage Vo and a current signal S in the control circuit 111. That is, in the control circuit 111, the control signal C is asserted in response to an internal clock and negated with the timing the value of the current signal S has reached the output voltage Vo. Accordingly, the duty cycle of the control signal C is controlled based on the output voltage Vo and the current signal S. As mentioned earlier, a method for setting the duty cycle of the control signal C based on the comparison between the output voltage Vo and the current signal S is generally called "current mode control."

Next, referring to FIG. 10, changes in the voltage and current in each section of the switching power supply unit according to this embodiment will be detailed.

In case the load 118 is light and the output current Io is small, a choke current iL is inverted with a predetermined timing (time t10) in a period the first transistor 103 is OFF (from time t15 to next time T13), as shown in FIG. 10. In this case, the inverted current flows via the third transistor 106 that is ON.

When the second transistor 102 turns ON (time t11) while the inverted current flowing in the third transistor 106, the inverted current does not flow in the secondary wiring of the transformer 102 and the path in the second transistor 105 but flows only via the third transistor 106, because the transformer 102 is short circuited by the third transistor 106.

In such a state, when the third transistor 6 turns OFF (time t12), the inverted current starts to flow via a current path formed of the secondary wiring of the transformer 2 and the second transistor 105. Thus, a fly-back voltage does not appear across the third transistor 106 that has turned OFF. In this practice, the current flowing in the secondary wiring of the transformer 102 is also provided to the primary wiring of the transformer 102 thus discharging the parasitic capacity of the first transistor 103.

Figure 12:
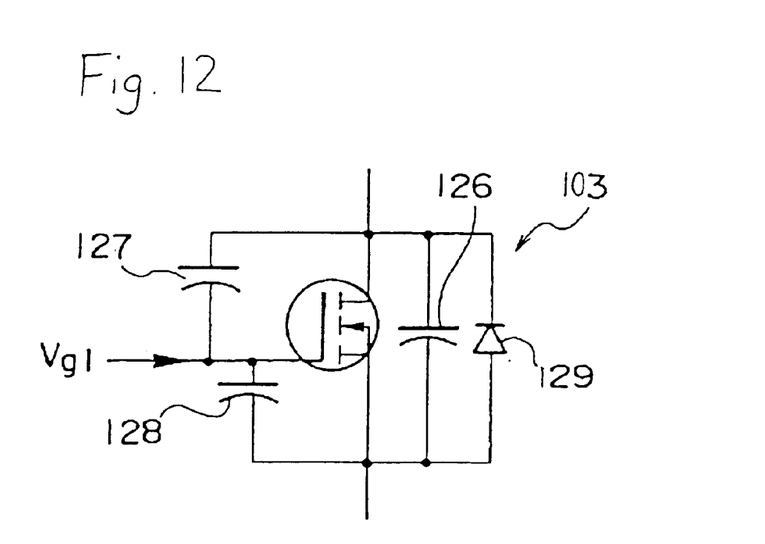
FIG. 12 is an equivalent circuit showing a parasitic component in the first transistor 3.

FIG. 12 is an equivalent circuit showing a parasitic component contained in the first transistor 103.

As shown in FIG. 12, the first transistor 103 has parasitic capacities 126 through 128 and a parasitic diode 129. As mentioned earlier, when the first transistor 103 turns ON, the parasitic capacities 126 and 127 are discharged and the current flows via the parasitic diode 129. As a result, a voltage vFET1 across the first transistor 103 drops rapidly, to substantially zero. The current flowing in the parasitic capacities 126 and 127 and the parasitic diode 129 is regenerated into the DC input power supply 101.

Finally the first transistor 103 turns ON (time t13) to excite the primary wiring of the transformer 102 thus increasing the inductor current iL. When the first transistor 103 turns ON, a current having the negative polarity is flowing in the first transistor 103 and this current is offset by a current flowing in the secondary wiring thus eliminating a spike current. In this practice, as mentioned earlier, the voltage vFET1 across the first transistor 103 is substantially zero so that the requirements of ZVS (Zero Voltage Switching) are satisfied thus a switching loss and a switching noise are negligible.

Figure 13:
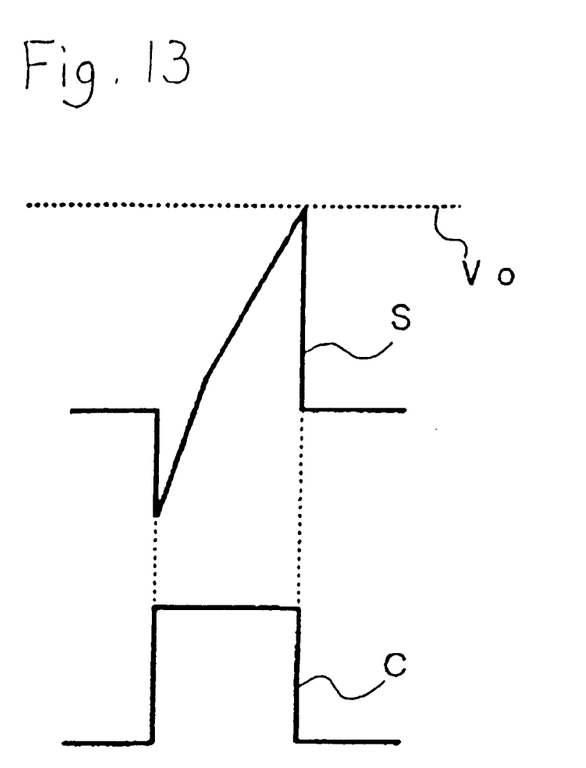
FIG. 13 is a timing chart showing a method for generating a control signal C in the second embodiment of the invention.

FIG. 13 is a timing chart showing a method for generating a control signal C in this embodiment.

As shown in FIG. 13, in this embodiment, the current signal S does not include a spike waveform thus allowing correct comparison between the output voltage Vo and the current signal S, thereby generating a control signal C having a proper duty cycle.

In this way, according to this embodiment, the current signal S does not include a spike waveform so that it is possible to generate a control signal C having a proper duty cycle. Moreover, a fly-back voltage does not appear across the third transistor 106 so that it is possible to prevent damage to the elements as well as eliminate the need for using a transistor having a high withstand voltage as the third transistor 106. Further, the requirements for ZVS are substantially satisfied when the first transistor 103 turns ON so that it is possible to reduce a switching loss and a switching noise caused by the first transistor 103.

It goes without saying that, the invention is not limited to this embodiment but various changes may be made.

For example, while the control signal C is supplied to the timing adjusters 112 through 114 in common and delay characteristics of the timing adjusters 112 through 114 are used to obtain the waveforms of the first to third gate signals Vg1 through Vg3 shown in FIG. 10 in the this embodiment, the first to third gate signals Vg1 through Vg3 having waveforms shown in FIG. 10 maybe directly generated via the control circuit 111, without using the timing adjusters 112 through 114.

While the current signal S is detected between the first transistor 103 and the negative terminal of the DC input power supply in this embodiment, the section where the current signal is detected is not limited to that position. For example, the current signal S may be generated by detecting a current flowing the primary winding or secondary winding of the transformer 102.

As mentioned earlier, according to the invention, a switching power supply unit that can effectively prevent occurrence of a fly-back voltage without increasing the number of elements and a method of driving the switching power supply unit are provided.

Further, according to the invention, a switching power supply unit that can effectively prevent occurrence of a spike waveform in a current signal without increasing the number of elements and a method of driving the switching power supply unit are provided.

What is claimed is:

1. A switching power supply unit comprising:

a switch circuit including a first switch, said switch circuit which converts a DC input into an AC;

a transformer which transforms the AC;

an output rectifier including a second switch serially connected to said transformer and a third switch connected in parallel to said transformer, said output rectifier which rectifies the output of said transformer; and a controller which controls ON/OFF of said first to third switch, wherein said controller turns ON said second switch before turning OFF said third switch and before turning ON said first switch.

2. The switching power supply unit as claimed in claim 1, wherein said control circuit controls ON/OFF of said first to third switch via voltage mode control.

3. The switching power supply unit as claimed in claim 1, wherein said control circuit controls ON/OFF of said first to third switch via current mode control.

4. The switching power supply unit as claimed in claim 3, wherein said current mode control uses at least information about the volume of a current flowing in said transformer and information about the output voltage value of said output smoothing section to control ON/OFF of said first to third switches.

5. A switching power supply unit comprising:

a switch circuit including a first switch, said switch circuit which converts a DC input into an AC;

a transformer which transforms the AC;

an output rectifier including a second switch serially connected to said transformer and a third switch connected in parallel to said transformer, said output rectifier rectifying the output of said transformer;

an output smoothing section including a choke coil serially connected to said transformer and a smoothing capacitor connected in parallel to said transformer, said output smoothing section which smoothes the output of said output rectifier; and a controller which controls ON/OFF of said first to third switches, wherein said controller turns ON said second switch then turns OFF said third switch after turning ON said second switch while the inverted current from said choke coil is flowing into said third switch, and turns ON said first switch after turning OFF said third switch.

6. The switching power supply unit as claimed in claim 5, wherein said control circuit controls ON/OFF of said first to third switch via voltage mode control.

7. The switching power supply unit as claimed in claim 5, wherein said control circuit controls ON/OFF of said first to third switch via current mode control.

8. The switching power supply unit as claimed in claim 7, wherein said current mode control uses at least information about the volume of a current flowing in said transformer and information about the output voltage value of said output smoothing section to control ON/OFF of said first to third switches.

9. A driving method for a switching power supply unit including a switch circuit having a first switch, said switch circuit converting a DC input into an AC, a transformer which trans forms said AC, an output rectifier having a second switch serially connected to said transformer and a third switch connected in parallel to said transformer, said output rectifier rectifying the output of said transformer, and an output smoothing section having at least a choke coil serially connected to said transformer and a smoothing capacitor connected in parallel to said transformer, said output smoothing section smoothing the output of said output rectifier, said driving method comprising the steps of:

turning ON said second switch;

turning OFF said third switch after the step of turning ON said second switch; and turning ON said first switch after the step of turning OFF said third switch.

10. A driving method for a switching power supply unit including a switch circuit having a first switch, said switch circuit converting a DC input into an AC, a transformer which transforms the AC, an output rectifier having a second switch serially connected to said transformer and a third switch connected in parallel to said transformer, said output rectifier rectifying the output of said transformer, and an output smoothing section having a choke coil serially connected to said transformer and a smoothing capacitor connected in parallel to said transformer, said output smoothing section smoothing the output of said output rectifier, said driving method comprising the steps of:

lowering the voltage across said first switch by feeding the inverted current from said choke coil into said transformer;

turning OFF said third switch after turning ON said second switch; and turning ON said first switch after the step of lowering the voltage across said first switch and after turning OFF said third switch.

11. A driving method for a switching power supply unit including a switch circuit having a first switch, said switch circuit converting a DC input into an AC, a transformer which transforms said AC, an output rectifier having a second switch serially connected to said transformer and a third switch connected in parallel to said transformer, said output rectifier rectifying the output of said transformer, and an output smoothing section having a choke coil serially connected to said transformer and a smoothing capacitor connected in parallel to said transformer, said output smoothing section smoothing the output of said output rectifier, said driving method comprising the step of:

generating a control signal based on at least a volume of a current flowing in said transformer and an output voltage value of said output smoothing section;

turning ON said second switch based on said control signal;

turning OFF said third switch after the step of turning ON said second switch based on said control signal; and turning ON said first switch after the step of turning OFF said third switch based on said control signal.

* * * * *